US012631835B2

(12) United States Patent
Mii

(10) Patent No.: US 12,631,835 B2
(45) Date of Patent: May 19, 2026

(54) OPTICAL RECEIVER

(71) Applicant: SUMITOMO ELECTRIC INDUSTRIES, LTD., Osaka (JP)

(72) Inventor: Kazuaki Mii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 483 days.

(21) Appl. No.: 18/323,447

(22) Filed: May 25, 2023

(65) Prior Publication Data

US 2023/0384539 A1      Nov. 30, 2023

(30) Foreign Application Priority Data

May 30, 2022    (JP) ................................. 2022-087454

(51) Int. Cl.
G02B 6/42          (2006.01)
G02B 6/32          (2006.01)

(52) U.S. Cl.
CPC ............. G02B 6/4214 (2013.01); G02B 6/32 (2013.01); *G02B 6/4206* (2013.01)

(58) Field of Classification Search
CPC ....... G02B 6/32; G02B 6/4206; G02B 6/4214
See application file for complete search history.

(56) References Cited

U.S. PATENT DOCUMENTS

| | | | | |
|---|---|---|---|---|
| 6,454,470 | B1 * | 9/2002 | Dwarkin | .............. G02B 6/4214 |
| | | | | 385/33 |
| 7,118,293 | B2 * | 10/2006 | Nagasaka | ............ G02B 6/4214 |
| | | | | 385/89 |
| 9,310,571 | B2 * | 4/2016 | Hung | ...................... G02B 6/425 |
| 10,359,572 | B2 * | 7/2019 | Kang | ................... G02B 6/4249 |
| 2006/0239605 | A1 * | 10/2006 | Palen | ..................... G02B 6/423 |
| | | | | 385/33 |
| 2011/0170831 | A1 | 7/2011 | Tamura | |
| 2013/0148970 | A1 | 6/2013 | Nakajima et al. | |
| 2019/0109650 | A1 * | 4/2019 | Mii | ...................... G02B 6/4215 |

FOREIGN PATENT DOCUMENTS

| | | |
|---|---|---|
| JP | H08-181658 A | 7/1996 |
| JP | 2011-142268 A | 7/2011 |
| JP | 2013-125045 A | 6/2013 |
| JP | 2014-137476 A | 7/2014 |
| JP | 2015-031814 A | 2/2015 |
| JP | 2017-032731 A | 2/2017 |

* cited by examiner

*Primary Examiner* — Daniel Petkovsek
(74) *Attorney, Agent, or Firm* — McDonald Hopkins LLC

(57)          ABSTRACT
According to one embodiment, there is provided an optical receiver including: a beam reducer including an incident lens condensing first collimated light having a first diameter to a focal point, an emitting lens receiving light emitted from the incident lens and emitting second collimated light having a second diameter smaller than the first diameter, and a main body provided between the incident lens and the emitting lens, the main body having the focal point inside; and a light receiving element including a light receiving lens condensing the second collimated light and a light receiving portion receiving the light condensed by the light receiving lens.

4 Claims, 7 Drawing Sheets

OPTICAL RECEIVER

CROSS-REFERENCE TO RELATED APPLICATION

This application claims priority from Japanese Patent Application No. 2022-087454, filed on May 30, 2022, the entire subject matter of which is incorporated herein by reference.

TECHNICAL FIELD

The present disclosure relates to optical receivers.

BACKGROUND

Japanese Unexamined Patent Publication No. 2013-125045 describes an optical receiver module. The optical receiver module includes a receptacle portion and a package portion. The receptacle portion has a first lens receiving light from an optical fiber. The package portion includes an optical demultiplexer receiving light from the first lens, a reflector reflecting light demultiplexed by the optical demultiplexer, and a second lens receiving the light reflected by the reflector. The optical receiver module further includes a light receiving element, and the light receiving element receives the light condensed by the second lens.

Japanese Unexamined Patent Publication No. 2014-137476 describes an optical receiver module and a manufacturing method thereof. The optical receiver module includes a package portion, and an optical demultiplexer, a reflector, a condensing lens, and a light receiving element are arranged inside the package portion. The light demultiplexed by the optical demultiplexer is incident on the reflector and is reflected by the reflector. The light reflected by the reflector is condensed by the condensing lens and is incident on the light receiving element.

Japanese Unexamined Patent Publication No. 2017-32731 describes a wavelength-multiplexing optical receiver module. The wavelength-multiplexing optical receiver module includes a collimating lens converting input light into collimated light, a wavelength division filter dividing the collimated light into a plurality of signal lights based on a wavelength, and a mirror reflecting the divided signal light. The wavelength-multiplexing optical receiver module further includes a lens array having a condensing lens condensing the signal light reflected by the mirror and a photo diode (PD) receiving the condensed signal light.

In the above-described optical receiving module, light passing through an optical receptacle connected to an optical fiber is converted into collimated light by a collimating lens, and signal light for each wavelength is separated by an optical demultiplexer having an optical filter and a mirror corresponding to each wavelength. After each separated signal light is reflected by the mirror, the signal light condensed by a lens array and reaches a light receiving element.

In order to satisfy a desired photoelectric conversion characteristics in the light receiving element, it is required to arrange each component with high accuracy and optically couple each component to the light receiving element with low loss. However, by simply arranging each component with high accuracy, the light amount of the reflected return light from the lens on the surface of the light receiving element may be allowed to exceed a predetermined light amount. Therefore, it may be required to reduce the reflected return light while maintaining the characteristics of the light receiving sensitivity of the light receiving element.

An object of the present disclosure is to provide an optical receiver capable of reducing reflected return light.

SUMMARY

According to the present disclosure, there is provided an optical receiver including: a beam reducer including an incident lens condensing first collimated light having a first diameter to a focal point, an emitting lens receiving light emitted from the incident lens and emitting second collimated light having a second diameter smaller than the first diameter, and a main body provided between the incident lens and the emitting lens, the main body having the focal point inside; and a light receiving element including a light receiving lens condensing the second collimated light and a light receiving portion receiving the light condensed by the light receiving lens.

According to the present disclosure, reflected return light can be reduced.

DETAILED DESCRIPTION

Figure 1:
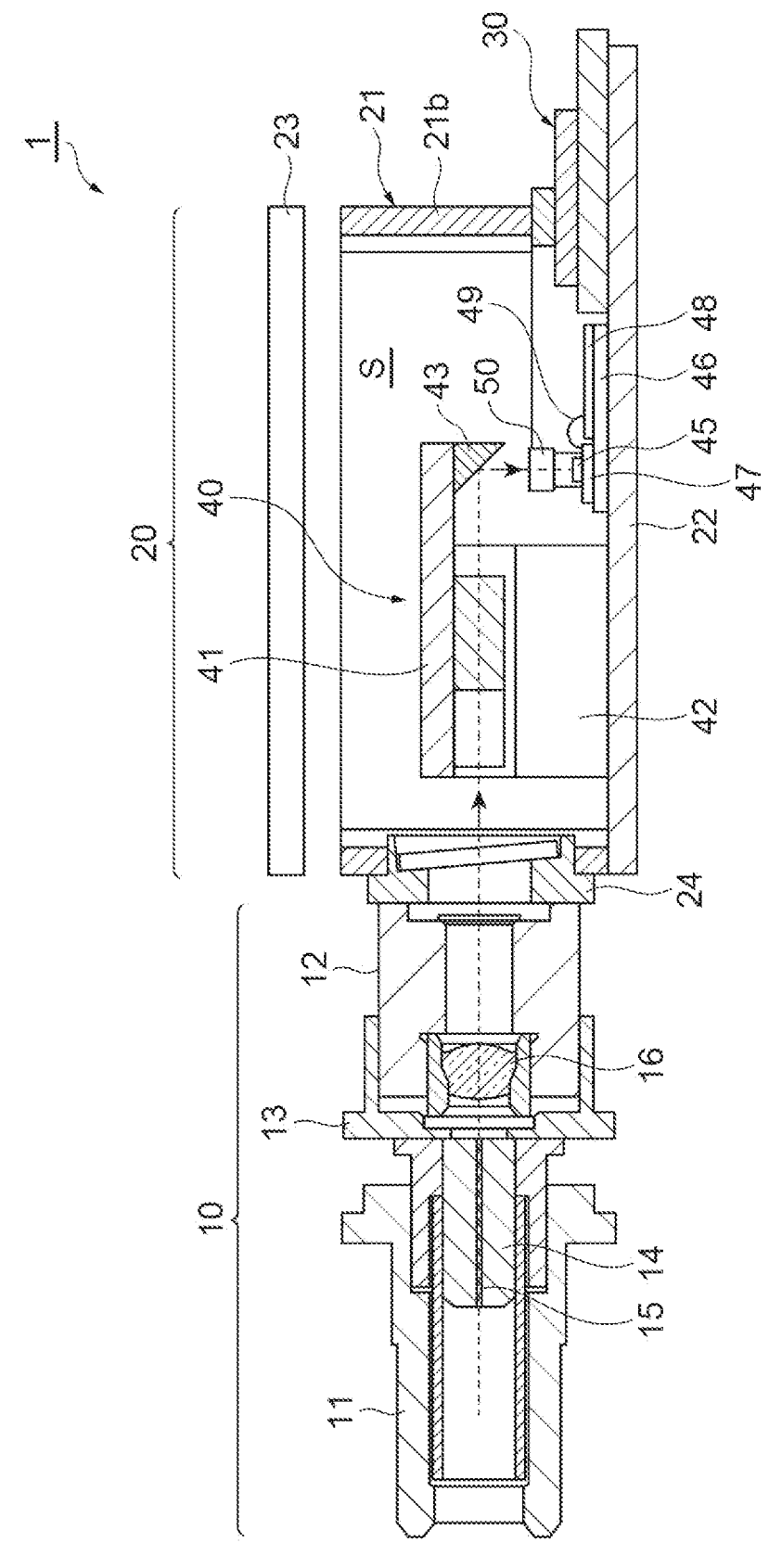
FIG. 1 is a cross-sectional view illustrating an internal structure of an optical receiver according to an embodiment.

Description of Embodiments of the Present Disclosure

First, contents of an embodiment of an optical receiver according to the present disclosure will be listed and explained. (1) According to the embodiment, the optical receiver includes: a beam reducer including an incident lens condensing first collimated light having a first diameter to a focal point, an emitting lens receiving light emitted from the incident lens and emitting second collimated light having a second diameter smaller than the first diameter, and a main body provided between the incident lens and the emitting lens, the main body having the focal point inside; and a light receiving element including a light receiving lens condensing the second collimated light and a light receiving portion receiving the light condensed by the light receiving lens.

This optical receiver includes the beam reducer having the incident lens and the emitting lens and the light receiving element having the light receiving lens and the light receiving portion. The incident lens converts the incident first collimated light into converged light, and light diverging from the focal point of the converged light is converted into the second collimated light by the emitting lens. A second diameter of the second collimated light is smaller than a first diameter of the first collimated light. The light receiving lens of the light receiving element receives the second collimated light instead of the converged light. Therefore, the light receiving lens receives the second collimated light having a diameter smaller than the diameter of the first collimated light, so that the reflected return light from the light receiving lens can be reduced. Therefore, since a light amount of the reflected return light from the light receiving lens, which is the surface of the light receiving element, can be prevented from exceeding a predetermined light amount, it is possible to reduce the reflected return light while maintaining the characteristics of a light receiving sensitivity of the light receiving element.

(2) In (1) above described, the beam reducer may have the reflecting surface inside, and the reflecting surface may be provided between the incident lens and the focal point to vertically reflect the first collimated light.

(3) In (1) or (2) above described, the optical receiver may include: a collimating lens emitting the first collimated light incident on the beam reducer; and an optical demultiplexer provided between the beam reducer and the collimating lens.

(4) In (3) above described, the beam reducer and the collimating lens may be integrated lens units, the lens unit may have a recessed portion between the beam reducer and the collimating lens, and the optical demultiplexer may be arranged at a bottom of the recessed portion. In this case, since the optical receiver has the lens unit in which the beam reducer and the collimating lens are integrated, components of the optical receiver can be assembled easily and with high accuracy. In addition, optical components including the optical demultiplexer provided between the beam reducer and the collimating lens can be mechanically aligned without alignment.

(5) In (3) above described, an emitting-side end face of the collimating lens and an incident-side end face of the optical demultiplexer may be bonded to each other via an adhesive.

(6) In any one of (1) to (5) above described, a curvature of the light receiving lens may be larger than a curvature of the emitting lens of the beam reducer.

DETAILS OF EMBODIMENT OF PRESENT DISCLOSURE

A specific example of the optical receiver according to the embodiment of the present disclosure will be described below with reference to the drawings. It is noted that the present invention is not limited to the following examples, but is intended to include all modifications indicated within the scope of the claims and the scope of equivalents to the scope of the claims. In the description of the drawings, the same or corresponding elements are denoted by the same reference numerals, and redundant descriptions are omitted as appropriate. In addition, the drawings may be partially simplified or exaggerated for easy understanding, and dimensional ratios and the like are not limited to those described in the drawings.

FIG. 1 is a diagram illustrating a cross section of an optical receiver 1 according to one embodiment. FIG. 1 is a diagram schematically illustrating a cross section of the optical receiver 1, omitting some of the components mounted on the optical receiver 1. The optical receiver 1 receives a wavelength multiplexed optical signal in which a plurality of signal lights having different kinds of wavelengths (for example, $\lambda_1$ to $\lambda_8$) are multiplexed. The optical receiver 1 demultiplexes the received wavelength-multiplexed optical signal into the plurality of signal lights and outputs an electrical signal corresponding to each signal light. The optical receiver 1 includes a receptacle portion 10, a package portion 20, and a terminal portion 30.

It is noted that, in the following, for the convenience, a direction of viewing the receptacle portion 10 from the package portion 20 will be referred to as "front", "front side", or "forward", and a direction of viewing the package portion 20 from the receptacle portion 10 will be referred to as "back" or "back side", or "backward". However, these directions are for the convenience of description and do not limit arrangement positions of the components and the like.

The receptacle portion 10 couples, for example, a single-mode optical fiber. The receptacle portion 10 includes a sleeve 11 into which a ferrule of an optical connector external to the optical receiver 1 is inserted, a holder 12 joining the receptacle portion 10 to the package portion 20, and a joint sleeve 13 connecting the sleeve 11 and the holder 12 to each other.

The package portion 20 accommodates an optical component and a light receiving element receiving light passing through the optical component. For example, the package portion 20 has a rectangular parallelepiped shape. The package portion 20 has, for example, a package frame 21, a bottom wall 22, and a lid 23. The package frame 21 has a rectangular cylindrical shape. The bottom wall 22 constitutes a bottom of the package portion 20. The bottom wall 22 contains, for example, copper molybdenum or copper tungsten. Since the copper molybdenum and the copper tungsten have high thermal conductivity, when the bottom wall 22 contains copper molybdenum or copper tungsten, heat dissipation in the bottom wall 22 can be improved.

The lid 23 is provided to close an opening formed in an upper portion of the package frame 21. The lid 23 is fixed to the package frame 21 so as to seal an internal space S of the package portion 20 after the components of the optical receiver 1 are arranged and wired inside the package frame 21. The package portion 20 has, for example, the bush 24. The bush 24 presents an annular shape. A surface toward the front side of the bush 24 has a flat shape.

The terminal portion 30 is provided for electrical connection with an external circuit of an external device of the optical receiver 1. The terminal portion 30 has, for example, a plurality of stacked ceramic substrates. The terminal portion 30 is fixed to the package portion 20 while being fitted into a wall portion 21b of the package frame 21. The terminal portion 30 electrically connects elements inside the package portion 20 and devices outside the optical receiver 1 to each other. The terminal portion 30 has a high frequency line and a power supply line.

The holder 12 of the receptacle portion 10 is fixed to the package portion 20 via the bush 24. The sleeve 11 is coupled to the holder 12 via the joint sleeve 13. Alignment is performed by the joint sleeve 13 in an axial direction (a horizontal direction in FIG. 1) and a radial direction (a vertical direction in FIG. 1 and a direction perpendicular to a plane of FIG. 1).

The receptacle portion 10 has, for example, a stub 14. The stub 14 is arranged inside the sleeve 11. As described above, a ferrule of an external optical connector is inserted into the sleeve 11, and the ferrule holds the external optical fiber. This external optical fiber optically couples with an optical fiber 15 held by the stub 14. The receptacle portion 10 has a lens 16 arranged inside the holder 12. The lens 16 converts light emitted from the optical fiber 15 into, for example, collimated light. The wavelength-multiplexed signal light is emitted from the lens 16, and the wavelength-multiplexed signal light is emitted into the package portion 20 through an optical window sealed by the bush 24.

The package portion 20 has the optical module 40 demultiplexing the wavelength-multiplexed signal light emitted from the lens 16 into a plurality of signal lights having different wavelengths. The optical module 40 has a support substrate 41 on which the optical components of the optical receiver 1 are mounted. For example, the optical module 40 has a support member 42, and the support substrate 41 is arranged at a position spaced apart from the bottom wall 22 by the support member 42. The optical components mounted on the support substrate 41 are arranged to face the bottom wall 22.

The package portion 20 has a mirror 43, a beam reducer, and a light receiving element 45. An example in which the beam reducer is a first collimating lens 50 will be described below. Each of the plurality of signal lights demultiplexed by the optical module 40 is bent by 90° at the mirror 43 and emitted from the mirror 43 toward the bottom wall 22. The first collimating lens 50 has a plurality of lenses condensing a plurality of the respective signal lights. The package portion 20 has a plurality of the light receiving elements 45, and each light receiving element 45 receives the signal light condensed by each of a plurality of the lenses.

The first collimating lens 50 and the light receiving element 45 are mounted on, for example, the package portion 20 via a first mounting substrate 46 mounted on the bottom wall 22 and a second mounting substrate 47 mounted on the first mounting substrate 46. For example, a transimpedance amplifier (TIA) 48 located between the second mounting substrate 47 and the terminal portion 30 is mounted on the first mounting substrate 46. The TIA 48 is electrically connected to the light receiving element 45 via, for example, a wire 49. Hereinafter, the direction in which the light receiving element 45 is provided as viewed from the bottom wall 22 will be referred to as "up", "upper side", or "upward", and the direction in which the bottom wall 22 is provided as viewed from the light receiving element 45 will be referred to as "down", "lower side", or "downward". However, these directions are for the convenience of description and do not limit directions of the respective components.

Figure 2:
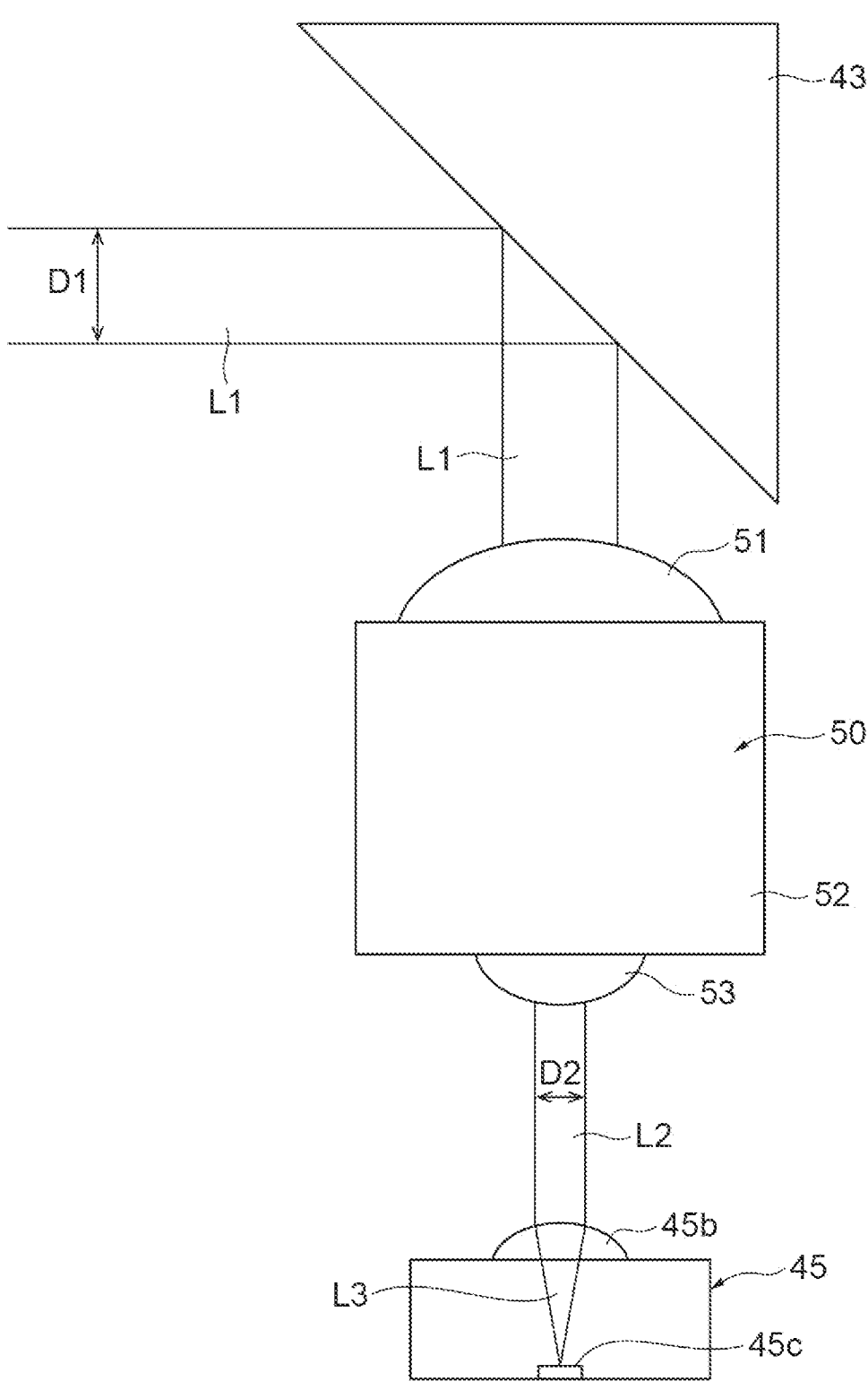
FIG. 2 is a diagram illustrating a first collimating lens and a light receiving element of the optical receiver of FIG. 1.

FIG. 2 is an enlarged view of an area of the optical receiver 1 where the mirror 43, the first collimating lens 50, and the light receiving element 45 are arranged. The optical receiver 1 further includes the first collimating lens 50 arranged between the mirror 43 and the light receiving element 45. The light (signal light) incident on the mirror 43 and the light reflected by the mirror 43 are first collimated light L1 having a predetermined diameter D1 (first diameter). The first collimating lens 50 receives the first collimated light L1 reflected by the mirror 43 and converts the first collimated light L1 into second collimated light L2 having a diameter D2 (second diameter) smaller than the predetermined diameter D1. The first collimating lens 50 emits the second collimated light L2 toward the light receiving element 45.

The light receiving element 45 is, for example, a photo diode (PD). The light receiving element 45 includes a light receiving lens 45b receiving the second collimated light L2 and a light receiving portion 45c receiving light L3 condensed by the light receiving lens 45b. The light receiving portion 45c has, for example, a disc shape. The light receiving lens 45b is, for example, a convex lens protruding toward the first collimating lens 50 side and has a curved surface facing the first collimating lens 50. The light L3 incident on the light receiving portion 45c is converted into an electric signal (photo current) and transmitted to the TIA 48 via the wire 49 described above. For example, the second collimated light L2 from the first collimating lens 50 is vertically incident on a vertex of the light receiving lens 45b.

Figure 3:
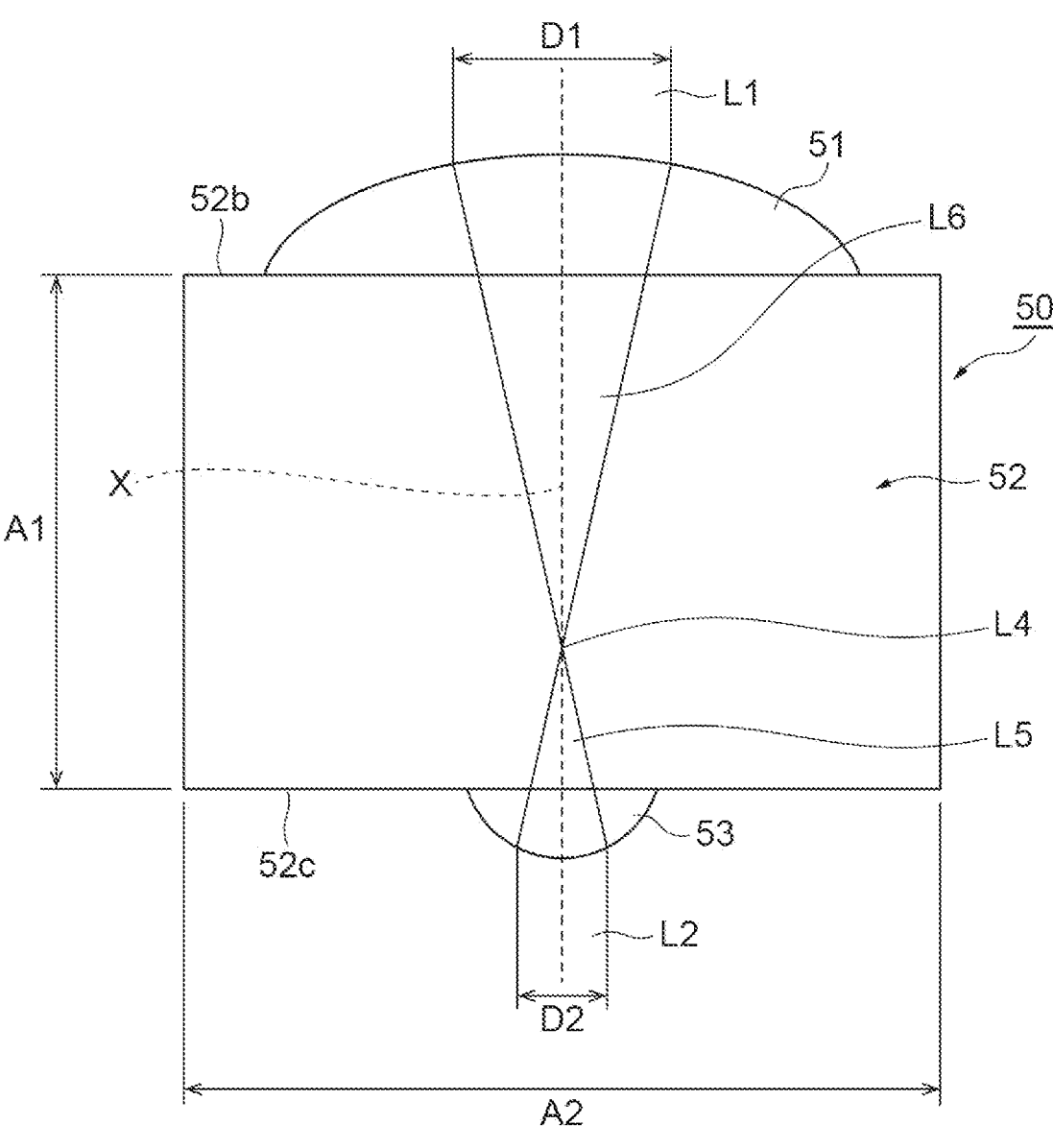
FIG. 3 is a diagram illustrating the first collimating lens of FIG. 2.

FIG. 3 is an enlarged view of the first collimating lens 50. As illustrated in FIG. 3, the first collimating lens 50 includes, for example, an incident lens 51 allowing the first collimated light L1 to be incident on, a block 52 (main body) in which a focal point L4 formed by the first collimated Light L1 being incident on the incident lens 51 is formed, and an emitting lens 53 receiving light L5 spreading from the focal point L4 and converting the light L5 into the second collimated light L2.

The incident lens 51 is a convex lens protruding toward the mirror 43 and has a curved surface facing the mirror 43. The block 52 has the focal point L4 inside. The block 52 has, for example, a rectangular parallelepiped shape. The block 52 has a first surface 52b with the incident lens 51 formed on, a second surface 52c facing the opposite side of the first surface 52b, and the emitting lens 53 is formed on the second surface 52c. The block 52 transmits light L6 condensed by the incident lens 51, the focal point L4 of the light L6, and the light L5 spreading from the focal point L4. The emitting lens 53 is a convex lens protruding toward the light receiving element 45 and has a curved surface facing the light receiving element 45. The emitting lens 53 converts the light L5 into the second collimated light L2 and emits the converted second collimated light L2 to the light receiving element 45.

In the following, the functions and effects obtained from the optical receiver 1 according to the embodiment will be described above. The optical receiver 1 includes the first collimating lens 50 having the incident lens 51 and the emitting lens 53 and the light receiving element 45 having the light receiving lens 45b and the light receiving portion 45c. The incident lens 51 converts the incident first collimated light L1 into converged light L6, and the light L5 spreading from the focal point L4 of the light L6 is converted into the second collimated light L2 by the emitting lens 53. The diameter D2 of the second collimated light L2 is smaller than the diameter D1 of the first collimated light L1. The light receiving lens 45b of the light receiving element 45 receives the second collimated light L2 instead of the converged light.

Figure 4:
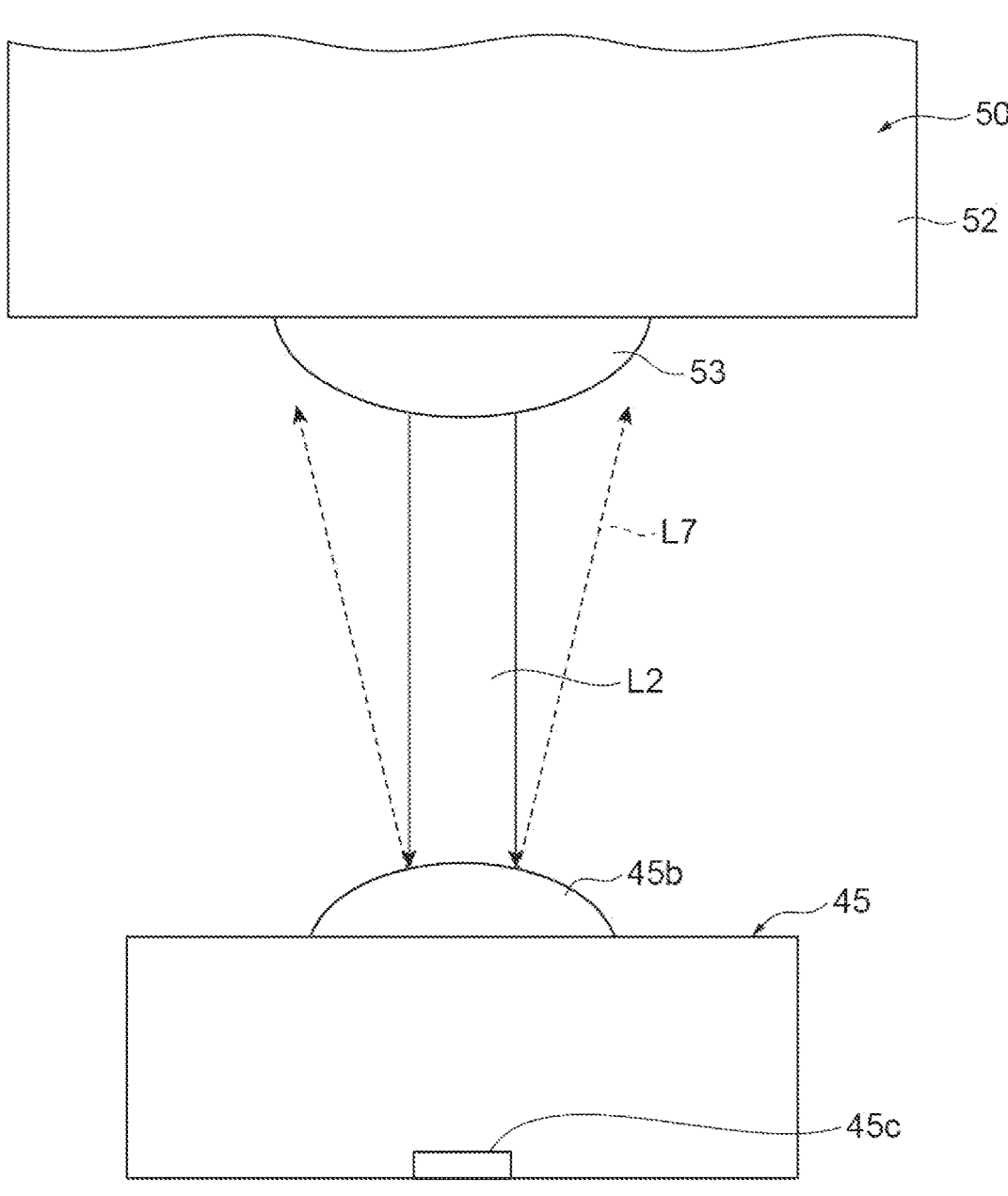
FIG. 4 is a diagram illustrating an emitting lens of the first collimating lens and a light receiving lens of the light receiving element of FIG. 2.

Therefore, as illustrated in FIG. 4, the light receiving lens 45b receives the second collimated light L2 having a diameter smaller than the diameter of the first collimated light L1, so that reflected return light L7 from the light receiving lens 45b can be reduced. Therefore, since a light amount of the reflected return light L7 from the light receiving lens 45b, which is the surface of the light receiving element 45, can be prevented from exceeding a predetermined light amount, it is possible to reduce the reflected return light L7 while maintaining the characteristics of a light receiving sensitivity of the light receiving element 45. More specifically, the light amount of the reflected return light L7 can be reduced to 1/1000 or less of the light amount of the second collimated light L2.

Figure 5:
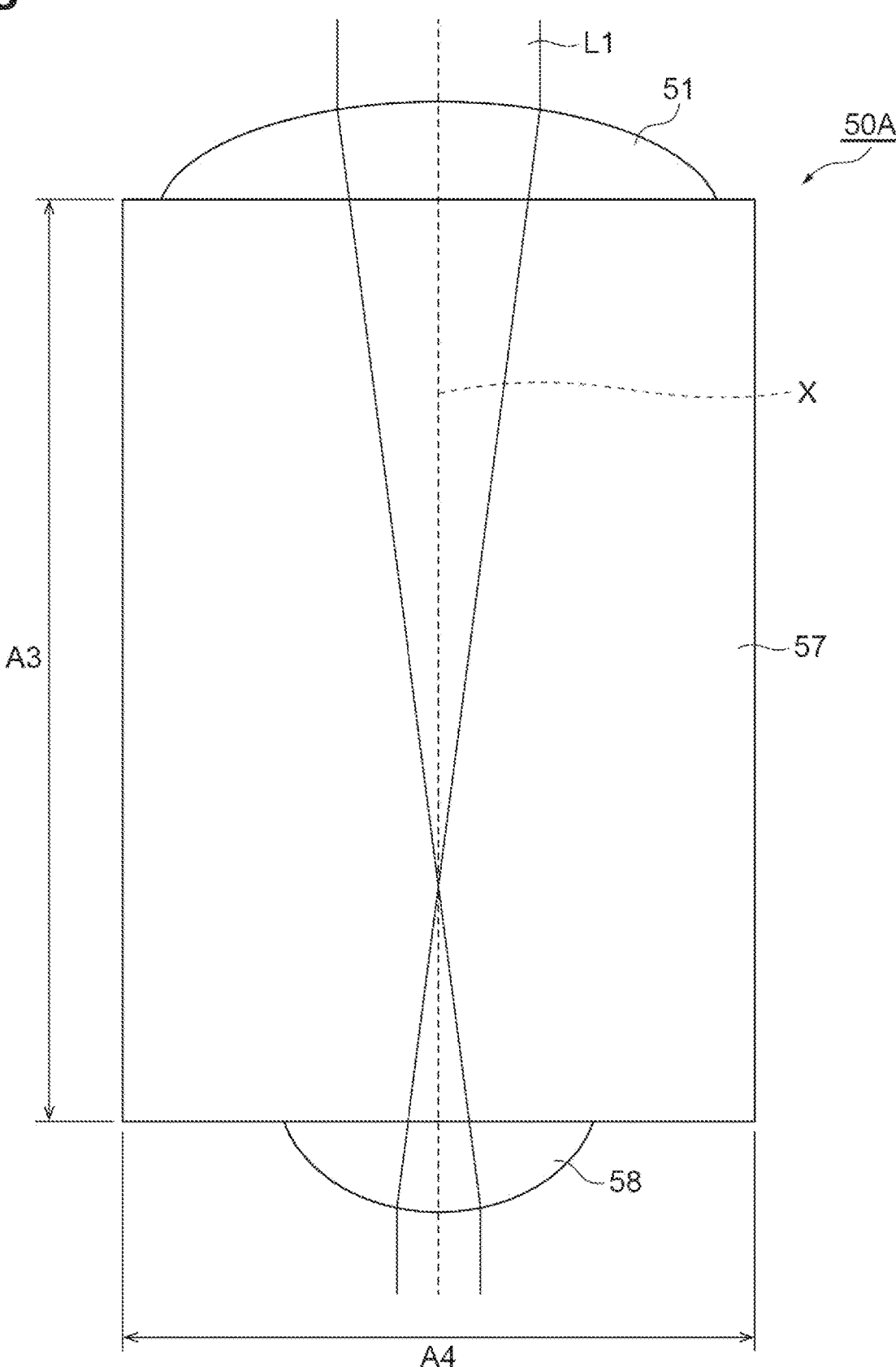
FIG. 5 is a diagram illustrating a first collimating lens of an optical receiver according to Modified Example 1.

Next, an optical receiver according to Modified Example 1 will be described with reference to FIG. 5. The optical receiver according to Modified Example 1 includes a first collimating lens 50A (beam reducer) different from the first collimating lens 50 described above. In the following description, the same components are denoted by the same reference numerals, and redundant description of the optical receiver 1 described above will be omitted as appropriate.

The first collimating lens 50A includes the incident lens 51 allowing the first collimated light L1 to be incident on, the block 57 different from the block 52 described above, and the emitting lens 58 different from the emitting lens 53 described above. As illustrated in FIGS. 3 and 5, for example, a length A1 of the block 52 in an optical axis direction, which is a direction in which the optical axis X of the first collimated light L1 extends, is shorter than a length A2 of the block 52 in a direction perpendicular to the optical axis. On the other hand, a length A3 of the block 57 in the optical axis direction is longer than a length A4 of the block 57 in a direction perpendicular to the optical axis. Furthermore, the length A3 is longer than the length A1.

For example, a curvature of the emitting lens 53 is larger than a curvature of the light receiving lens 45b of the light receiving element 45. A material of the emitting lens 53 is, for example, resin or silicon. A curvature of the emitting lens 58 is smaller than the curvature of the light receiving lens 45b of the light receiving element 45. That is, in Modified Example 1, the curvature of the light receiving lens 45b is larger than the curvature of the emitting lens 58 of the first collimating lens 50A. It is noted that it is desirable to suppress the inclination angle (mounting angle) of each of the emitting lens 53 and the emitting lens 58 with respect to the optical axis X to ±0.3° or less.

Figure 6:
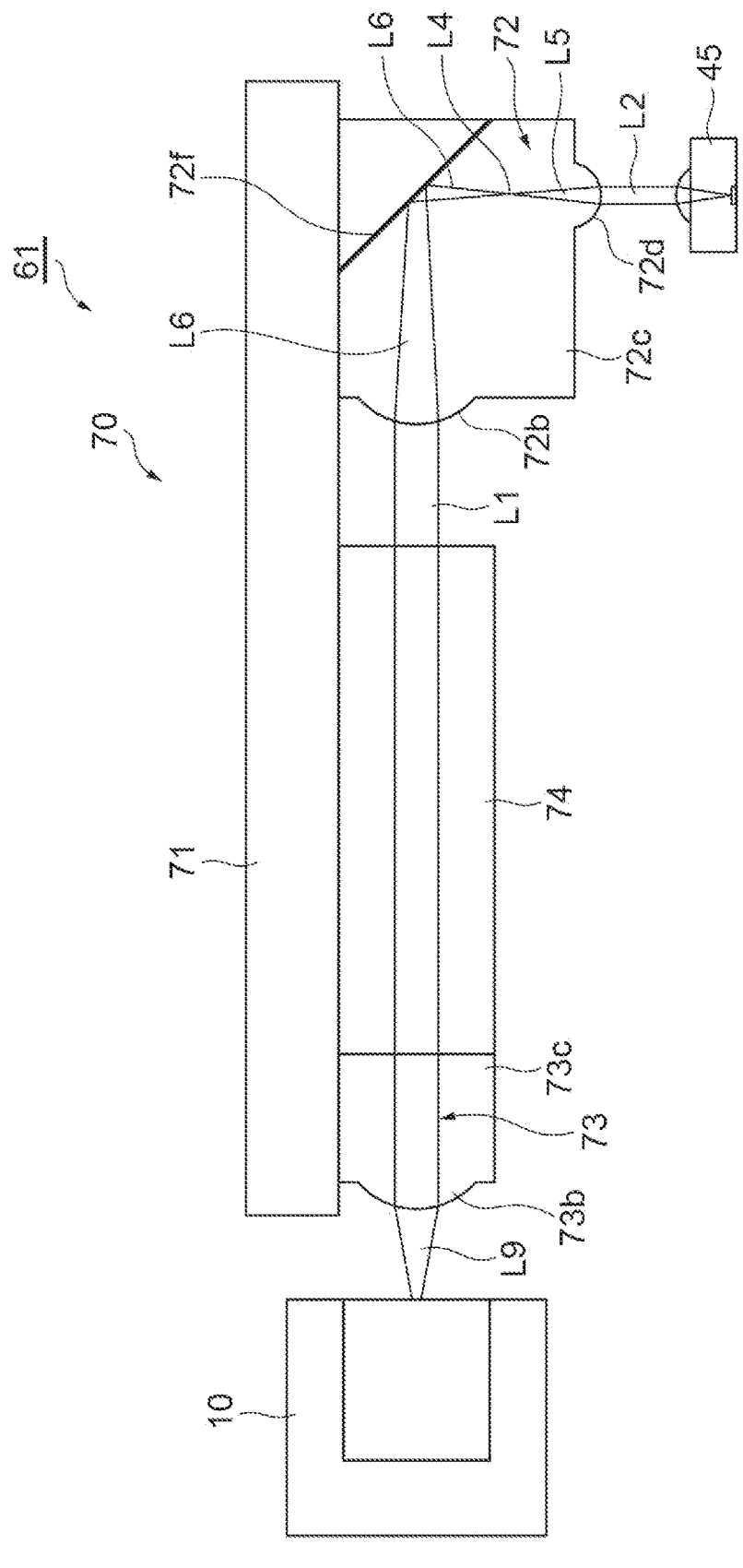
FIG. 6 is a diagram illustrating an optical receiver according to Modified Example 2.

Next, an optical receiver 61 according to Modified Example 2 will be described with reference to FIG. 6. FIG. 6 is a diagram schematically illustrating a configuration of a portion of the optical receiver 61. As illustrated in FIG. 6, optical receiver 61 has an optical module 70 different from the optical module 40. The optical module 70 includes a support substrate 71 arranged at the position separated from the bottom wall 22 and a first collimating lens 72, a second collimating lens 73 (collimating lens), and an optical demultiplexer 74 mounted on the support substrate 71. The first collimating lens 72 corresponds to the beam reducer. The first collimating lens 72 is located above the light receiving element 45, and the second collimating lens 73 is located behind the receptacle portion 10. The optical demultiplexer 74 is provided between the first collimating lens 72 and the second collimating lens 73.

The first collimating lens 72 includes an incident lens 72b allowing the first collimated light L1 to be incident on, a block 72c in which the focal point L4 is formed, an emitting lens 72d converting the light L5 into the second collimated light L2, and a reflecting surface 72f reflecting the light L6 from the incident lens 72b toward the emitting lens 72d. The reflecting surface 72f vertically reflects the first collimated light L1 and emits the second collimated light L2. More specifically, the reflecting surface 72f bends the light L6 emitted backward from the incident lens 72b by 90° and emits the light L6 downward. The focal point L4 of the light L6, which is converged light, is formed below the reflecting surface 72f. Then, the light L5 spreading downward from the focal point L4 is incident on the emitting lens 72d, and the emitting lens 72d converts the light L5 into the second collimated light L2 and emits the second collimated light L2 toward the light receiving element 45.

The second collimating lens 73 has, for example, an incident lens 73b allowing divergent light L9 from the receptacle portion 10 to be incident on and converting the divergent light L9 into the first collimated light L1 and a block 73c provided with the incident lens 73b. The first collimated light L1 is emitted from the incident lens 73b, and the first collimated light L1 emitted from the incident lens 73b is transmitted through the block 73c and reaches the optical demultiplexer 74. The optical demultiplexer 74 demultiplexes the first collimated light L1, and each of the first collimated light L1 demultiplexed by the optical demultiplexer 74 is incident on the first collimating lens 72. As described above, the optical receiver 61 according to Modified Example 2 includes the second collimating lens 73 emitting the first collimated light L1 incident on the first collimating lens 72 and the optical demultiplexer 74 provided between the first collimating lens 72 and the second collimating lens 73. This optical receiver 61 also provides the same functions and effects as those of the optical receiver 1 described above. The block 73c and the optical demultiplexer 74 are bonded with an adhesive. That is, the emitting-side end face of the second collimating lens 73 and the incident-side end face of the optical demultiplexer 74 are bonded to each other with the adhesive. In this case, return light can be suppressed.

Figure 7:
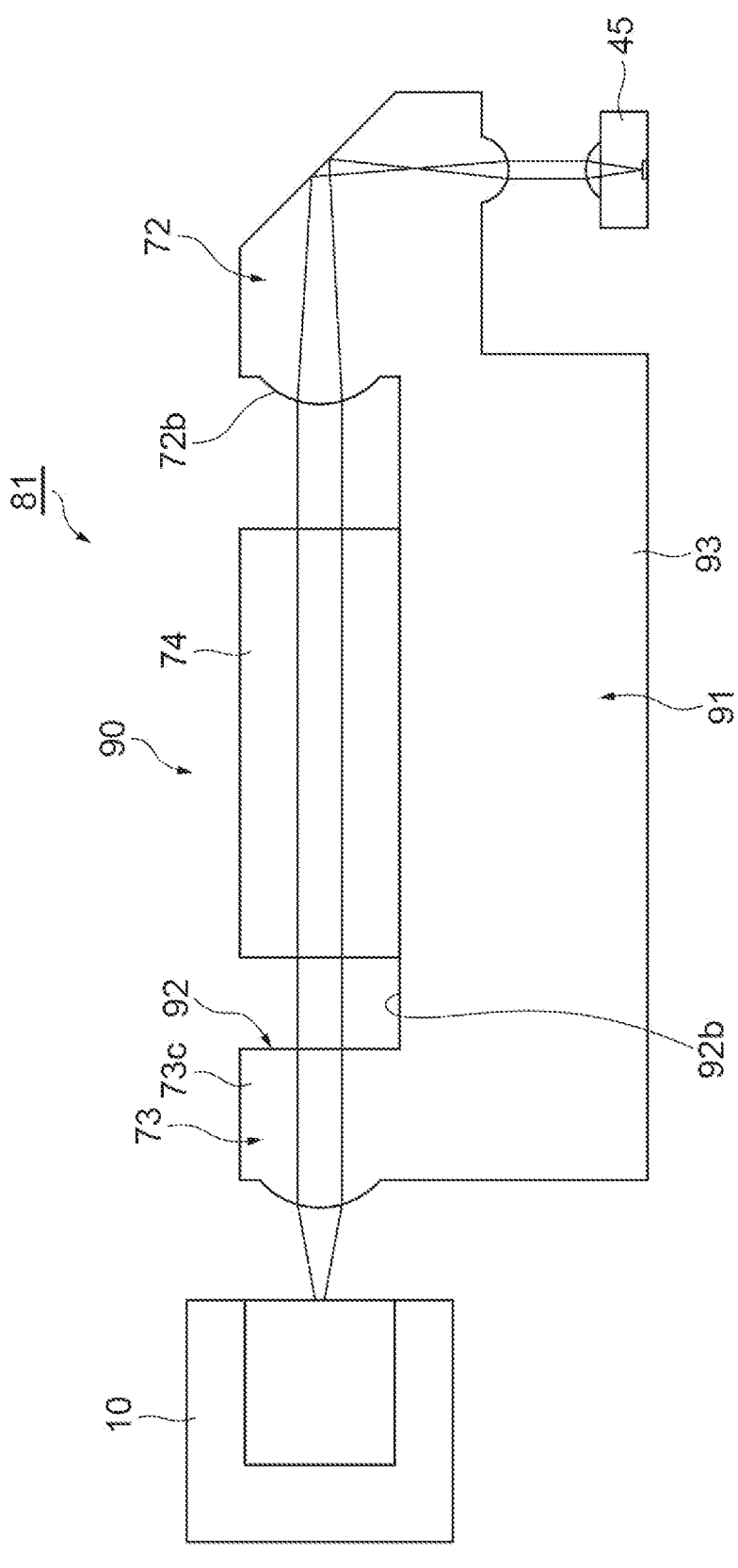
FIG. 7 is a diagram illustrating an optical receiver according to Modified Example 3.

Next, an optical receiver 81 according to Modified Example 3 will be described with reference to FIG. 7. FIG. 7 is a diagram schematically illustrating a configuration of a portion of the optical receiver 81. As illustrated in FIG. 7, the optical receiver 81 has an optical module 90 different from the optical module 70 described above. The optical module 90 has an optical demultiplexer 74 and a lens unit 91 in which the first collimating lens 72 and the second collimating lens 73 are integrated.

For example, the lens unit 91 has a recessed portion 92 located between the first collimating lens 72 and the second collimating lens 73, and the optical demultiplexer 74 is arranged in the recessed portion 92. That is, in the lens unit 91, the recessed portion 92 is provided between the first collimating lens 72 and the second collimating lens 73, and the optical demultiplexer 74 is arranged at the bottom of the recessed portion 92. The recessed portion 92 is defined by the incident lens 72b of the first collimating lens 72, the block 73c of the second collimating lens 73, and a bottom surface 92b extending from the block 73c to the incident lens 72b, and the optical demultiplexer 74 is arranged on the bottom surface 92b. The lens unit 91 has a block portion 93 mounted on the bottom wall 22. The second collimating lens 73 is provided on the front side and the upper side of the block portion 93, and the first collimating lens 72 is provided on the back side and the upper side of the block portion 93.

As described above, in the optical receiver 81 according to Modified Example 3, the first collimating lens 72 and the second collimating lens 73 are an integrated lens unit 91. Since the optical receiver 81 has the lens unit 91 in which the first collimating lens 72 and the second collimating lens 73 are integrated, components of the optical receiver 81 can be assembled easily and with high accuracy.

Furthermore, optical components including the optical demultiplexer 74 provided between the first collimating lens 72 and the second collimating lens 73 can be mechanically aligned without alignment.

Heretofore, the embodiments and various modifications of the optical receiver according to the present disclosure have been described.

However, the invention is not limited to the embodiments or modifications described above. It will be easily recognized by those skilled in the art that various modifications and changes of the present invention can be made without departing from the spirit of the claims. For example, the shape, size, number, material, and arrangement mode of each component of the optical receiver are not limited to the contents described above and can be changed as appropriate.

For example, in the above-described embodiment, the receptacle portion 10 including the sleeve 11, the holder 12, the joint sleeve 13, the stub 14, the optical fiber 15, and the lens 16 are exemplarily illustrated. However, the configuration of the receptacle portion of the optical receiver is not limited to the above-described examples and can be changed as appropriate. The configuration of the package portion and the configuration of the terminal portion are not limited to the above-described examples and can be changed as appropriate.

What is claimed is:

1. An optical receiver comprising:

a beam reducer including an incident lens condensing first collimated light having a first diameter to a focal point, an emitting lens receiving light emitted from the incident lens and emitting second collimated light having a second diameter smaller than the first diameter, and a main body provided between the incident lens and the emitting lens, the main body having the focal point inside;

a light receiving element including a light receiving lens condensing the second collimated light and a light receiving portion receiving the light condensed by the light receiving lens;

a collimating lens emitting the first collimated light incident on the beam reducer; and an optical demultiplexer provided between the beam reducer and the collimating lens, wherein the beam reducer and the collimating lens are an integrated lens unit, wherein the integrated lens unit has a recessed portion provided between the beam reducer and the collimating lens, and wherein the optical demultiplexer is arranged at a bottom of the recessed portion.

2. The optical receiver according to claim 1, wherein the beam reducer has a reflecting surface inside, and wherein the reflecting surface is provided between the incident lens and the focal point to vertically reflect the first collimated light.

3. The optical receiver according to claim 1, wherein an emitting-side end face of the collimating lens and an incident-side end face of the optical demultiplexer are bonded to each other via an adhesive.

4. The optical receiver according to claim 1, wherein a curvature of the light receiving lens is larger than a curvature of the emitting lens of the beam reducer.

* * * * *